United States Patent [19]

Koshiishi

[11] Patent Number: 4,652,933
[45] Date of Patent: Mar. 24, 1987

[54] IMAGE INFORMATION PROCESSING SYSTEM

[75] Inventor: Takaho Koshiishi, Tokyo, Japan

[73] Assignee: Ricoh Company, Ltd., Tokyo, Japan

[21] Appl. No.: 643,677

[22] Filed: Aug. 22, 1984

[30] Foreign Application Priority Data

Aug. 29, 1983 [JP] Japan ................................. 58-157434
Aug. 29, 1983 [JP] Japan ................................. 58-157433

[51] Int. Cl.⁴ ......................... H04N 1/00; H04N 1/04
[52] U.S. Cl. .................................... 358/256; 358/257;
358/903; 358/286; 364/518
[58] Field of Search ................ 358/256, 280, 257, 903,
358/286; 364/518, 519

[56] References Cited

U.S. PATENT DOCUMENTS

| | | | |
|---|---|---|---|
| 3,558,811 | 1/1971 | Montevecchio | 358/256 |
| 3,830,962 | 8/1974 | Mailboux | 358/257 |
| 3,920,896 | 11/1975 | Bishop et al. | 358/257 |
| 4,297,727 | 10/1981 | Ogawa et al. | 358/286 |
| 4,490,746 | 12/1984 | Moriguchi | 358/286 |
| 4,494,149 | 1/1985 | Furukawa | 358/257 |
| 4,514,767 | 4/1985 | Kubota et al. | 358/280 |

Primary Examiner—Howard W. Britton
Assistant Examiner—John K. Peng
Attorney, Agent, or Firm—Mason, Fenwick & Lawrence

[57] ABSTRACT

A combination of a facsimile apparatus and a personal computer. The personal computer is connected to the facsimile apparatus through 8 parallel data lines, a pair of unidirectional control signal lines and 3 bidirectional control signal lines. The combination has following four operation modes; recording mode where the data from the computer is recorded by a plotter in the facsimile apparatus, image input mode where the data from a scanner in the facsimile apparatus is input to the computer, transmission/transfer mode where the data from the computer is transmitted to another facsimile, and reception/transfer mode where the data from another facsimile is input to the computer.

16 Claims, 8 Drawing Figures

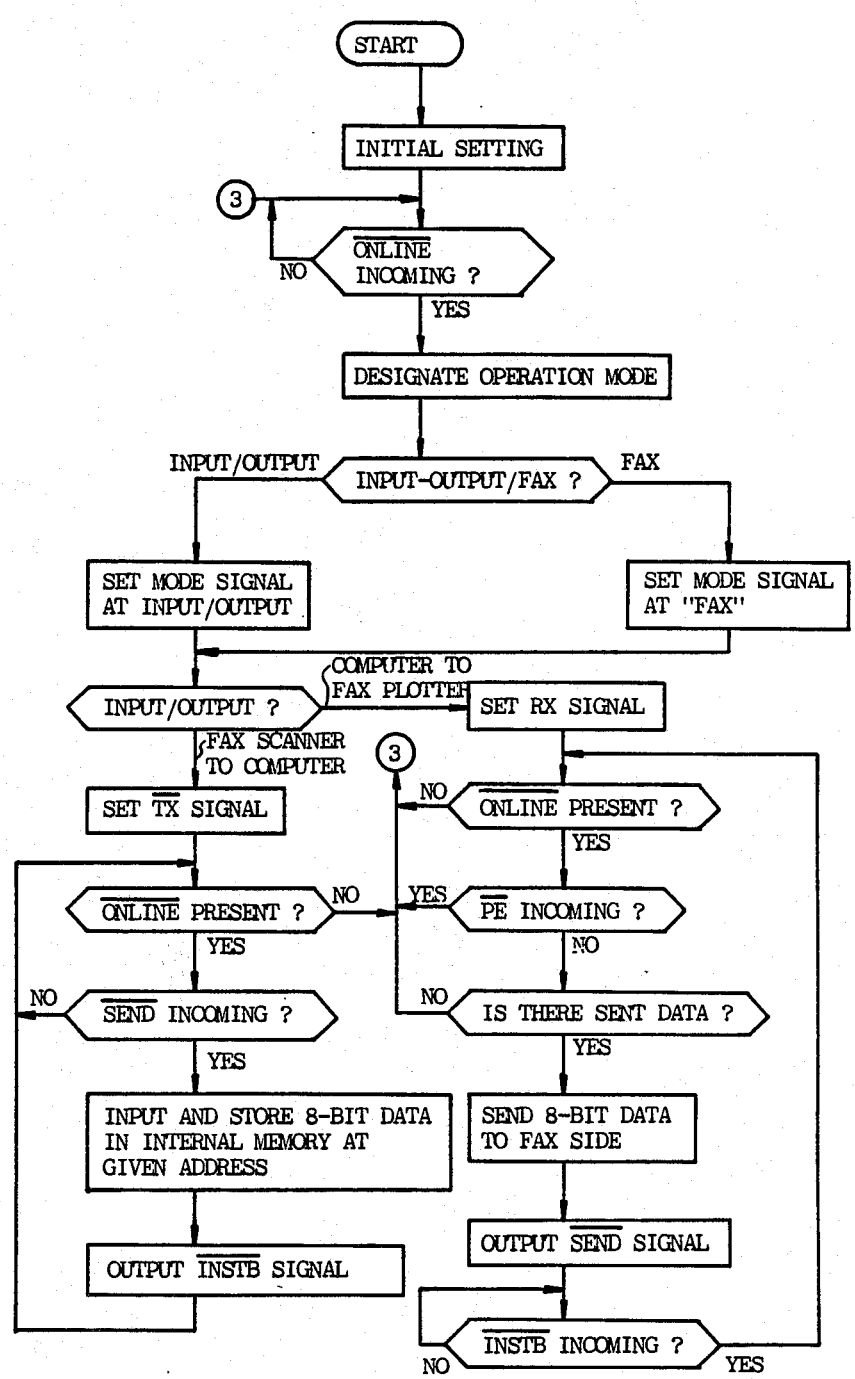

IMAGE INFORMATION PROCESSING SYSTEM

FIELD OF THE INVENTION

The present invention relates to an image information processing system which comprises an image reading unit, a recording unit, a communication unit, etc. as in a facsimile apparatus, and to which is connected a personal computer, etc. to permit any desired image information processing.

DESCRIPTION OF THE PRIOR ART

In recent years, there has been increased the need of transmitting and editing image data consisted of figures, characters, etc. Heretofore a facsimile apparatus has been employed as an apparatus for transmitting image information. The apparatus of this kind is, however, so designed as only to simply read the image of an original document for transmitting the read image to another facsimile as well as to receive image information sent from another facsimile for recording the same.

The user who employs a facsimile has a demand of, for example, extracting and transmitting the required area of an original document, transmitting the image of an original document with a particular area being masked, or transmitting the image of an original document added with particular patterns, characters, etc. In such a case, the document must be reedited using paste and scissors and then copied to prepare a document susceptible of transmission.

In general, offices or business premises must preserve a number of documents, which requires a very large preservation space and which makes very troublesome the retrieval operation for taking out a part thereof as well as the operation for putting in order those documents. If those documents are recorded as image data in any of various storage mediums, it would be possible to make small the space for preserving the documents and to simply perform retrieval and putting in order thereof using a computer or the like. However, the apparatus for use in reading image data from a document, etc. with high accuracy and applying the data to a computer as well as in recording the image data stored in the computer on a paper sheet with high quality, is usually large in size and very expensive, and it has only a function of reading and recording.

A facsimile apparatus is capable of reading, recording and communicating image data with relatively high accuracy. Therefore, if the conventional facsimile apparatus is modified to be connectable with a personal computer, etc. to permit transfer of image data between the facsimile and the computer, it would be possible to process the data in various manners and store the same on the computer side, to return the data back to the facsimile for recording, and to transmit the data from one facsimile to another facsimile apparatus, as required.

In the meantime, when connecting a computer or the like to a facsimile apparatus, the configuration of an interface unit is very important from the following reasons.

Firstly, since the image data read out of a document has a very large quantity of data, it takes a longer time period to transfer the data between the reading/recording apparatus and the computer if the data transmission speed is low. This results in a longer processing time and, when the reading/recording apparatus is combined with the ordinary facsimile, the transmitter side must wait for a long time frequently even upon receiving a reception request from another facsimile, because the apparatus is under operation. In case of transmitting data at a high speed, there has been heretofore used a parallel data transmission system (e.g., centronics interface).

Secondly, it is preferable to reduce the number of data lines for an interface and lines for a control signal, and hence to reduce the volume (or weight) of connection cables. In other words, with decreasing the number of lines, the cost of the connection cables themselves is lowered when the apparatus is interconnected through a long distance, and the presence of the connection cables becomes less obstructive when facsimiles, computers, etc. are used independently from each other or in combination with other equipment connectable thereto, and when they are moved as required. In such a case, there has been heretofore employed a serial data transmission system e.g., RS-232C interface.

However, the serial data transmission system is complicated and expensive in its circuit configuration and has a relatively low transmission speed, while the parallel data transmission system requires a very large number of data lines and control signal lines.

SUMMARY OF THE INVENTION

The present invention has for its first object to connect an information processor such as a computer with a facsimile apparatus, and for its second object to both make an inexpensive interface unit for use in connecting therebetween and connection cables, and achieve high-speed data transmission through the interface unit.

The parallel data transmission system is more fit for transmitting data at a high speed. When an image data reading/recording apparatus such as a facsimile apparatus is connected to an information processor such as a personal computer, an interface is required to perform the function of transmitting data from the image data reading/recording apparatus to the information processor as well as a function of transmitting data from the information processor to the image data reading-/recording apparatus. Accordingly, in case of using, for example, two sets of centronics interfaces, there are needed 16 data lines per se and at least about 6 control signal lines in addition to the former, so that the cables necessary for connecting those lines become very large in the volume and very high in the cost.

Now considering operation of the interface unit from the viewpoint of time, there is practically no possibility that the operation for inputting data into the image data reading/recording apparatus from the exterior is run simultaneously with the operation for outputting data to the exterior. The number of data lines is thus decreased to half, if those lines are formed as bidirectional lines to be commonly used for inputting and outputting. As to the control signal lines, since the data sending signal (SEND), for example, is a signal which is to be passed from the transmission side to the reception side and which is never issued from the reception side, it is also possible to commonly use the same lines as data sending lines for two apparatus on both sides.

When both the data lines and the control signal lines are formed of bidirectional lines in this way, the problem is in such a possibility that the apparatus on both sides may output respective signals on the same single line simultaneously. To avoid this, either one of the apparatus interconnected to each other may be designed to control the direction of a signal to be passed through the signal lines. When connecting an image data reading/recording apparatus to a personal computer or the like, if the image data reading/recording apparatus is designed to control the direction of signal, transmission the personal computer encounters a large limitation in preparing the program thereof, because it can not start to transmit data until the switching timing of the direction control signal and the processing program for the personal computer must be prepared in accordance with that timing. Therefore, it is preferable to control the direction of a signal on the interface line in accordance with a signal from an external apparatus (such as a personal computer which is connected to the interface.

Other objects and features, together with the foregoing, are attained in the embodiment described in the following description and illustrated in the accompanying drawings.

BRIEF DESCRIPTION OF THE DRAWINGS

FIG. 5 is a flowchart showing schematic operation of a personal computer 1; and

DESCRIPTION OF THE PREFERRED EMBODIMENT

Figure 1:
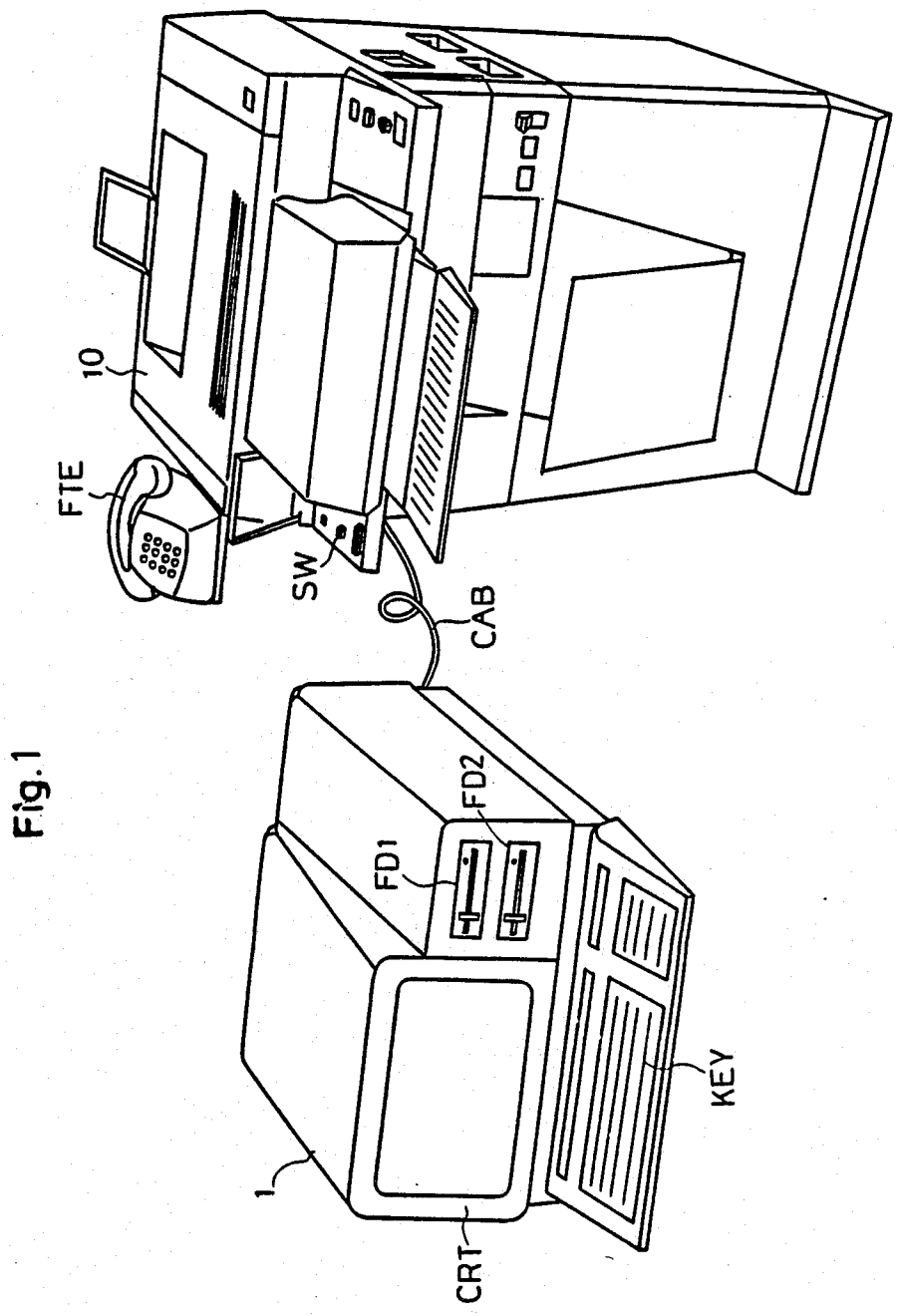
FIG. 1 is a perspective view of showing an image information processing system according to one embodiment of the present invention.

Referring first to FIG. 1, a personal computer 1 is connected to a facsimile apparatus 10 through an interface connection cable CAB in the illustrated embodiment. The facsimile apparatus 10 is equipped with a telephone set FTE which is connected to the public telephone line.

Figure 2:
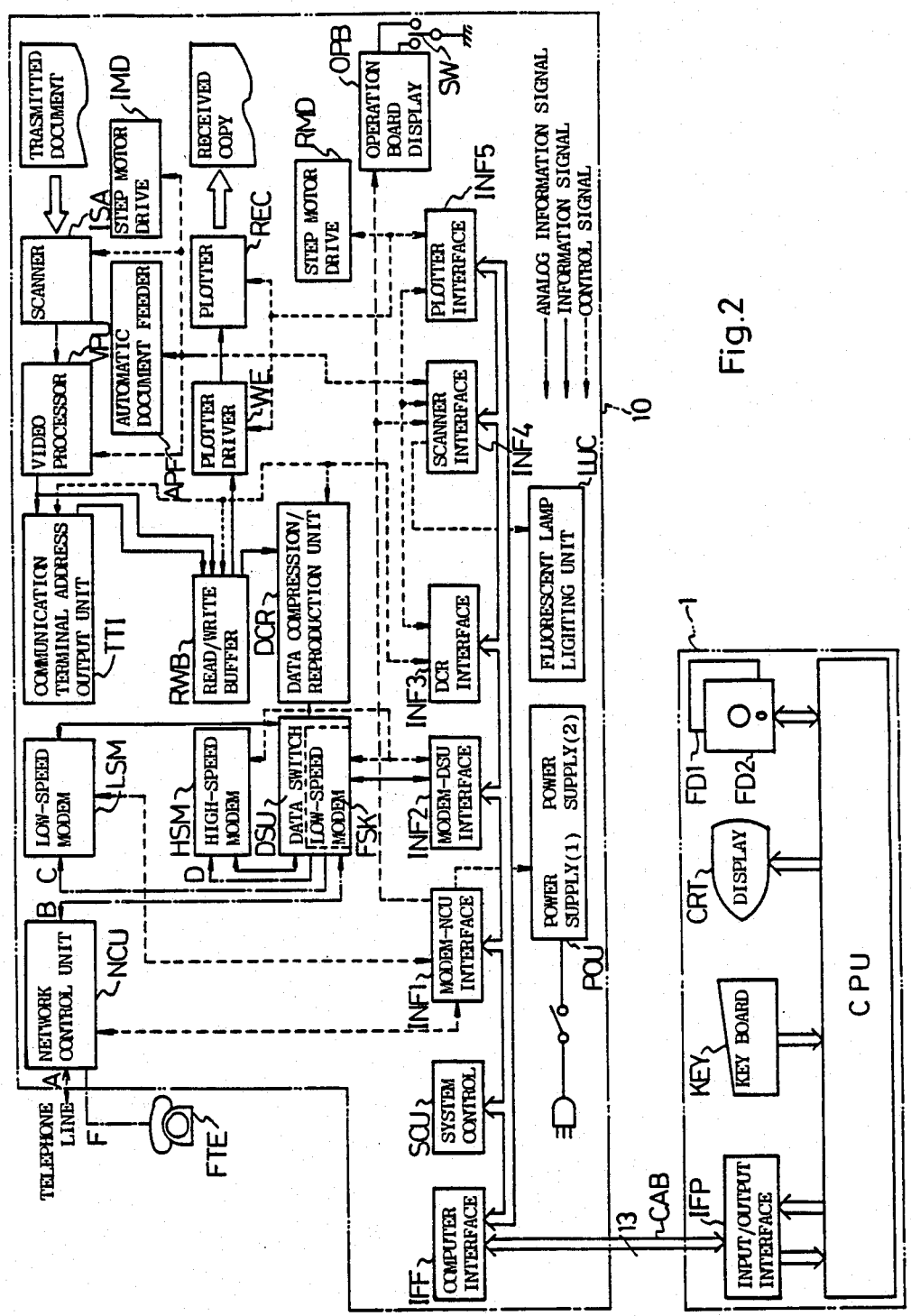
FIG. 2 is a block diagram showing the system configuration of FIG. 1.

FIG. 2 shows the schematic configuration of the system illustrated in FIG. 1 in the form of a block diagram. Now referring to FIG. 2, the personal computer 1 comprises a central processing unit CPU, an input-/output interface IFP, a keyboard KEY, a display CRT and external storage units FD1, FD2.

The facsimile apparatus 10 is composed of, from the viewpoint of its function, a network control unit NCU for controlling connection with the communication line, modulation/demodulation units (modems; LSM, HSM, FSK) for making conversion between an image signal and a communication signal, a data compression/reproduction unit DCR for compressing and coding image data and for reproducing image data from the compressed and coded data, a read/write buffer RWB for temporarily storing image data therein, a scanner ISA for reading image data of an original document, a plotter REC for hard-copying image data on a recording paper sheet, a system control unit SCU for controlling operation of the entire facsimile, and various interfaces. The respective functional blocks are connected to the system control unit SCU through the corresponding interface circuits.

The signal from the telephone line is provided via the network control unit NCU to a data switch unit DSU by which it is appropriately allocated to the modems LSM, HSM, FSK. Image information out of the demodulated signal is passed through the data compression/reproduction unit DCR and the read/write buffer RWB to drive a plotter driver WE, so that the plotter REC reproduces and records the image in the normal facsimile operation. In a transmission mode, the image signal processed by a video processor VPU is provided via the read/write buffer RWB to the DCR for compression, and thereafter applied to the modulation/demodulation units FSK, HSM, LSM.

A computer interface circuit IFF is connected to a bus line of the system control unit SCU, and the cable CAB connected in turn to the computer interface circuit is connected to the input/output interface circuit IFP of the personal computer 1.

Figure 3:
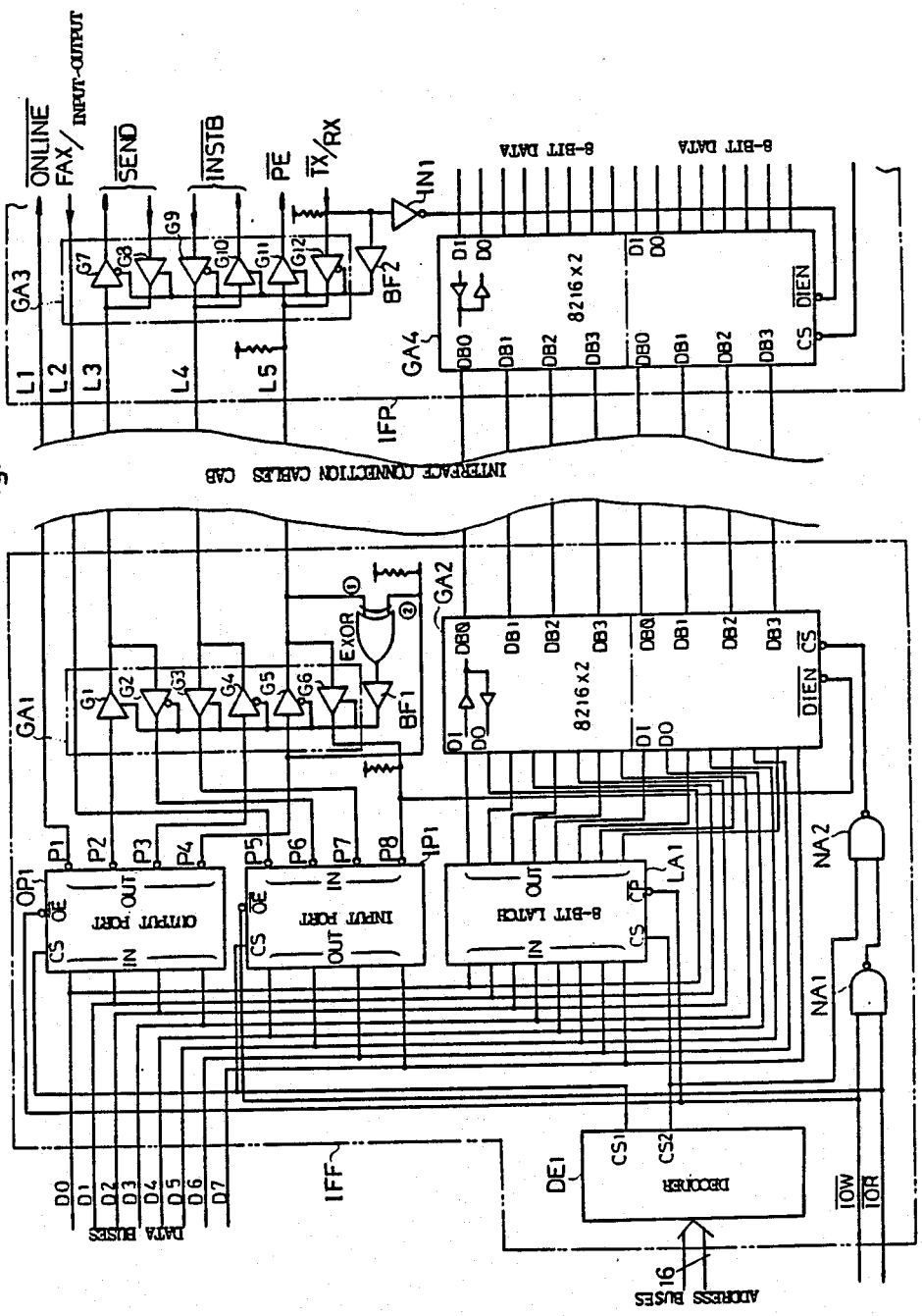
FIG. 3 is a detailed block diagram showing the configuration of a part of both computer interface IFF and input/output interface IFP shown in FIG. 2.

FIG. 3 shows in detail a part of both the computer interface circuit IFF equipped on the facsimile side and the input/output interface circuit IFP equipped on the personal computer side. Incidentally, those symbols in the figure which are given with overlines mean that the corresponding signals become effective when their signal levels assume a low level L.

Description will now be made by referring to FIG. 3. In this embodiment, the interface cable CAB comprises 13 signal lines and a not shown earth line. The signal lines consist of 8 data lines for transferring parallel data of 8-bit and 5 control signal lines L1, L2, L3, L4 and L5. Referring first to the input/output interface circuit IFP equipped on the side of the personal computer 1, bidirectional gate circuits GA3 and GA4 with three state outputs are connected to 3 control signal lines L1, L2, L3 and 8 data lines DB0–DB7, respectively.

The control signal line L1 is a line which allows a single unidirectional signal $\overline{\text{ONLINE}}$ to pass therethrough from the facsimile 10 side to the personal computer 1 side, and another control signal line L2 is a line which allows a single unidirectional signal FAX/Input-Output to pass therethrough from the personal computer 1 side to the facsimile 10 side. The remaining control signal lines L3, L4 and L5 are formed as bidirectional lines. The control signal line L3 allows either a signal $\overline{\text{SEND}}$ going from the computer 1 side to the facsimile side or a signal $\overline{\text{SEND}}$ going in the opposite direction to pass therethrough, the line L4 allows either a signal $\overline{\text{INSTB}}$ going from the computer 1 side to the facsimile side or a signal $\overline{\text{INSTB}}$ going in the opposite direction to pass therethrough, and the line L5 allows either a signal $\overline{\text{TX/RX}}$ going from the computer 1 side to the facsimile side or a signal $\overline{\text{PE}}$ going from the facsimile side to the computer 1 side to pass therethrough.

More specifically, when the personal computer 1 outputs a high level H as the signal $\overline{\text{TX/RX}}$, this signal is applied to the gate GA3 through a buffer BF2, thus causing G7, G9 and G12 out of the gate GA3 to close and G8, G10 and G11 to open. As a result, the signal $\overline{\text{SEND}}$ going from the computer 1 side to the facsimile 10 side, the signal $\overline{\text{INSTB}}$ going from the facsimile 10 side to the computer 1 side and the signal $\overline{\text{PE}}$ going from the facsimile 10 side to the computer 1 side, are disposed into such a state where they are able to pass through the gate GA3. At this time, a low level L is applied to a control terminal $\overline{\text{DIEN}}$ of the gate GA4 through an inverter IN1, thus setting 8-bit data going from the computer 1 side to the facsimile 10 side into such a state where it is able to pass through the gate GA4 (i.e., a transmission enable state as looked from the computer 1).

On the other hand, when the personal computer 1 outputs a low level L as the signal $\overline{TX/RX}$, G7, G9 and G12 out of the gate GA3 are opened and G8, G10 and G11 are closed. As a result, the signal $\overline{SEND}$ going from the facsimile 10 side to the computer 1 side, the signal $\overline{INSTB}$ going from the computer 1 side to the facsimile 10 side and the signal $\overline{TX/RX}$ going from the computer 1 side to the facsimile 10 side are set into such a state where they are able to pass through the gate GA3. The gate GA4 is set into such a state where the signal going from the facsimile 10 side to the computer 1 side is able to pass therethrough (i.e., a reception enable state as looked from the computer 1 side). It is to be noted that, because the control signal line L5 is pulled up to a power source line through a resistor, it assumes a high level H in the above state unless the signal $\overline{PE}$ is applied thereto from the facsimile side.

Referring now to the computer interface circuit IFF equipped on the facsimile 10 side, as with the foregoing interface circuit IFP, a bidirectional gate GA1 with three state outputs is connected to the control signal lines L3, L4 and L5, and a bidirectional gate GA2 is connected to the 8 data lines. The gate GA1 also includes an exclusive OR gate EXOR having input terminals ① and ② to which are connected the control signal line L5 and a port P4 of an output port OP1, respectively, and having an output terminal which is connected to a control signal input terminal of the gate GA1 through a buffer BF1. As to the gate GA1, when an output level of the buffer BF1 assumes L, G1, G3 and G6 are closed but G2, G4 and G5 are opened, while when an output level of the BF1 assumes H, G1, G3 and G6 are opened but G2, G4, G5 are closed. The control signal line L1 and input terminals of the gates G1, G4 and G5 are connected to ports P1, P2, P3 and P4 of the output port OP1, respectively, and the control signal line L2 and output terminals of the gates G2, G3 and G6 are connected to ports P5, P6, P7 and P8 of an input port IP1, respectively.

An 8-bit data latch LA1 is connected to a data input terminal DI of the gate GA2. Data input terminals of the output port OP1, data output terminals of the input port IP1, a data output terminal D0 of the gate GA2 and data input terminals of the data latch LA1 are connected to 8-bit data buses D0–D7 which in turn are connected to the system control unit SCU. Address information of 16-bit output from the unit SCU is applied to a decoder DE1 so as to produce two chip select signals CS1 and CS2. The signal CS1 is applied to both the output port OP1 and the input port IP1, while the signal CS2 is applied to both the data latch LA1 and a NAND gate NA2.

Signals $\overline{IOW}$ and $\overline{IOR}$ are control signals which are produced from the control signals for a microprocessor in the system control unit SCU, and they assume a low level L when the I/O port is selected and a write strobe pulse or a read strobe pulse is issued, respectively. Accordingly, when the microprocessor in the SCU designates the port address, with which the signal CS2 is issued, and then writes predetermined data, the written data is latched by the data latch LA1 to be applied to the gate GA2 and, if a terminal $\overline{DIEN}$ of the gate GA2 is applied with a low level L, such 8-bit data is output to the connection cable CAB. Meanwhile, when the processor commands reading with that port address, the information on data lines of the connection cable is read into the data buses if the terminal $\overline{DIEN}$ of the gate GA2 assumes a high level H.

Furthermore, when the processor designates the port address, with which the signal CS1 is issued, and then runs the writing operation, the lower 4-bit data on the data buses is issued from the output port OP1. And when it commands reading with that port address, the data is applied to the upper 4 bits of the data buses from the input port IP1.

Figure 4A:
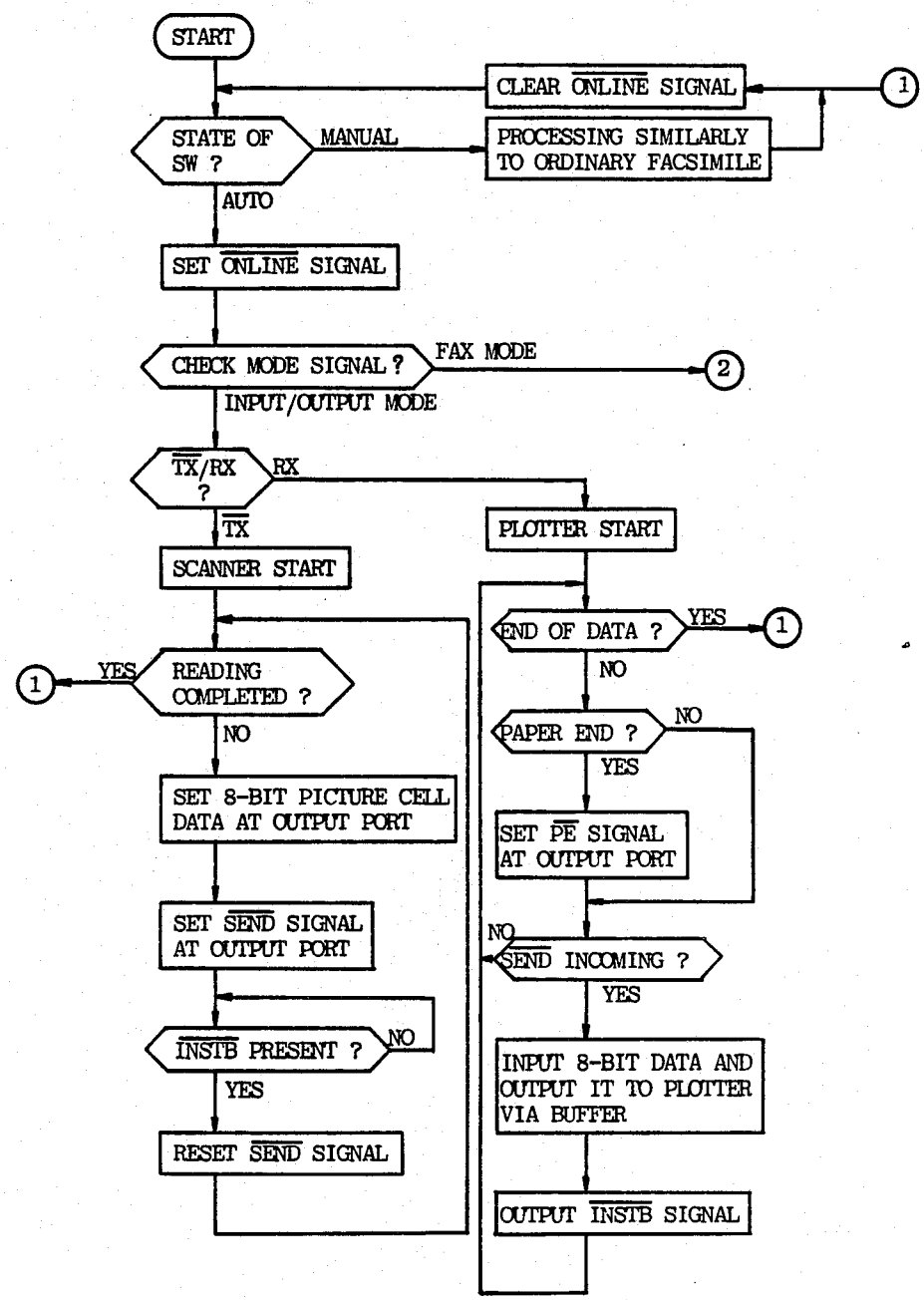
FIGS. 4a and 4b are flowcharts showing schematic operation of a system control unit SCU.
Figure 4B:
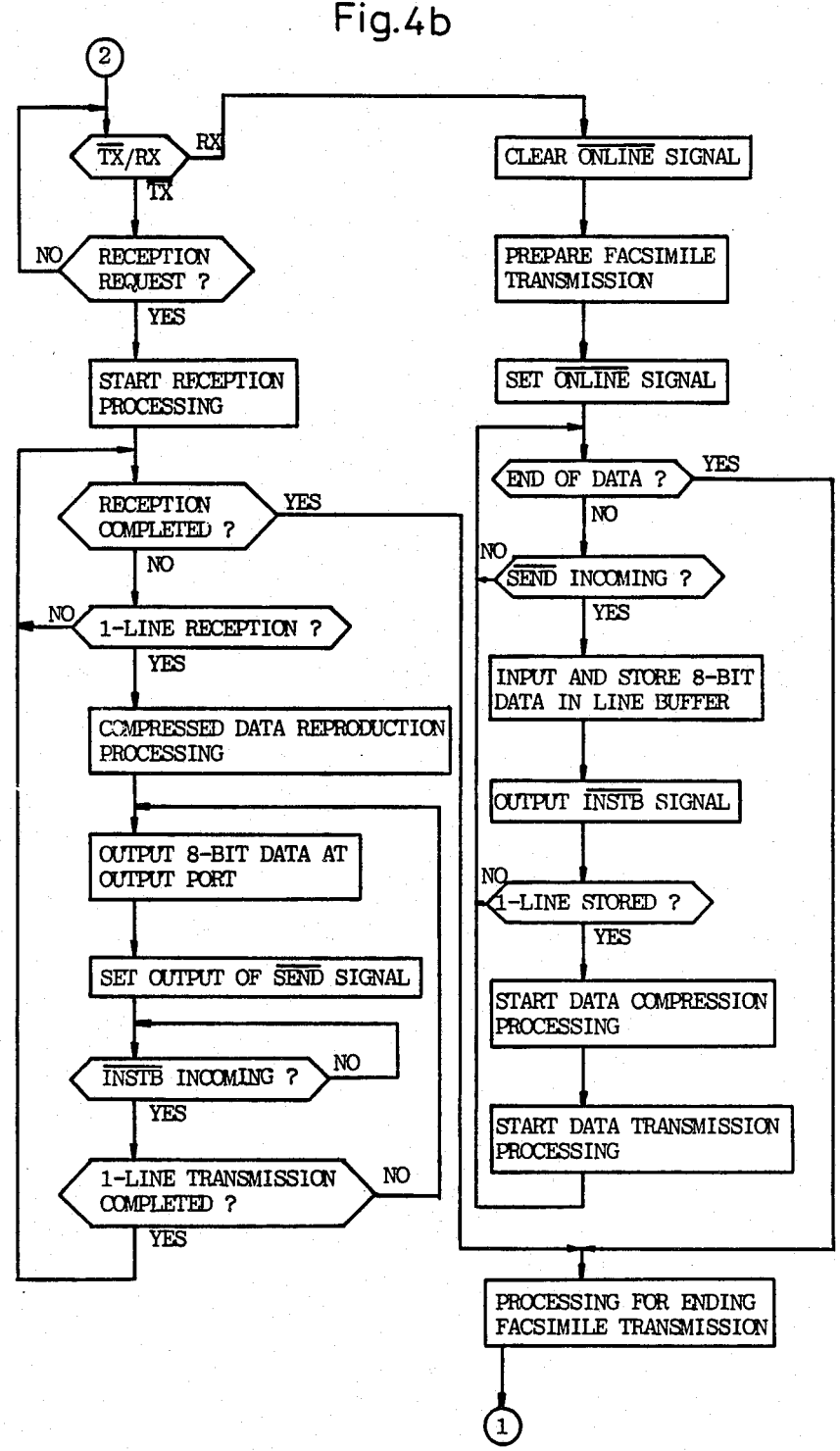
Figure 6A:
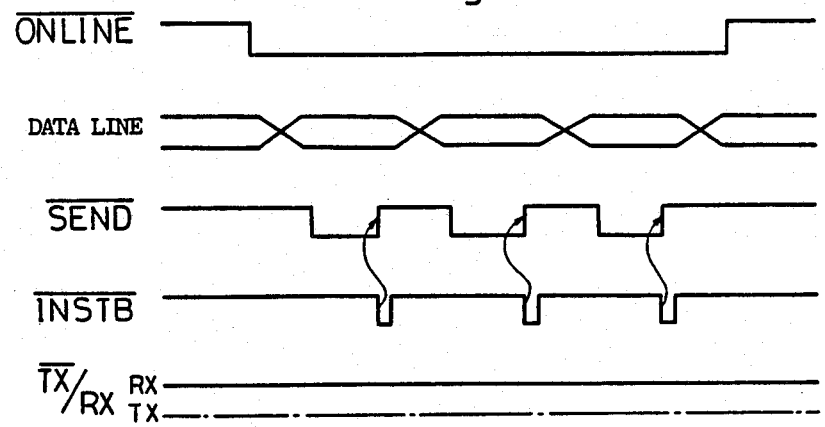
FIGS. 6a and 6b are timing charts showing examples of signal timing in an interface circuit.
Figure 6B:
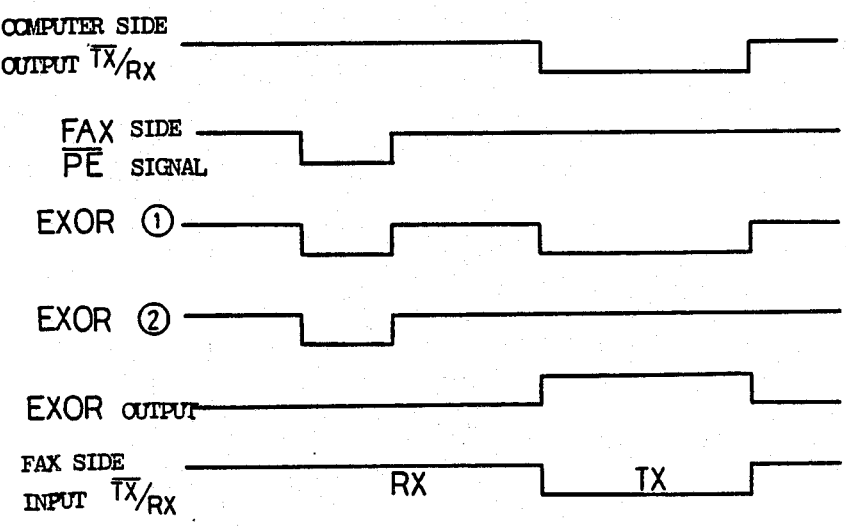

FIGS. 4a and 4b show schematic operation of the system control unit SCU in the facsimile 10, FIG. 5 shows schematic operation of the personal computer 1, and FIGS. 6a and 6b show examples of signal timing for the interface circuit.

Operation of the system control unit SCU in the facsimile 10 will be first described by referring to FIGS. 4a and 4b. After the completion of initial setting, the unit SCU reads the state of a mode selection switch SW and then performs the operation in accordance with the set state thereof. The switch SW is, as shown in FIG. 2, connected to an operation board OPB. When the switch SW is turned to the manual side, the unit SCU is caused to control the system to operate in the same manner as the ordinary facsimile.

When the switch SW is turned to the automatic side, the signal $\overline{ONLINE}$ is first output. More specifically, the port address with which the chip select signal CS1 is issued is designated and then 8-bit data with its bit 0 being set at "0" (=L) is written. This causes the control signal line L1 of the interface cable CAB to be set at a low level L.

Next, the mode signal on the control signal line L2 is checked. This is done by reading data after designating the port address, with which the chip select signal CS1 is issued, and then by discriminating whether the bit 4 of 8-bit data appeared on the data buses is "1" or "0". In this embodiment, it is supposed that the control signal of L (="0") offers a facsimile mode FAX and the same of H offers an input/output mode. Stated differently in summary, in this embodiment, a facsimile mode represents data transmission that is performed between the personal computer 1 and another facsimile connected through the telephone line, and an input/output mode represents data transmission that is performed between the facsimile 10 and the personal computer 1.

In case of an input/output mode, the level of the control signal line L5, i.e., the signal $\overline{TX/RX}$, is checked. When the signal level assumes $\overline{TX}$ (low level L), the system control unit SCU is caused to set a mode where the image data read by the scanner ISA of the facsimile 10 is sent to the personal computer 1 side.

In this operation mode, the unit SCU of the facsimile 10 stores the image data obtained by the scanner ISA in the read/write buffer RWB one line by one line, and then outputs the data to the connection cable CAB through the interface circuit IFF. To inform the reception side (the personal computer 1 in this case) of that the data is now being issued, the signal $\overline{SEND}$ of low level is set on the control signal line L3 (to hold this state L) after issuing the 8-bit data. Then, the signal level of the control signal line L4 is monitored to wait for the signal $\overline{INSTB}$ of low level indicating the completion of reception and sent from the data reception side (computer 1) will appear on the line L4. When the signal $\overline{INSTB}$ appears thereon, the unit SCU clears the $\overline{SEND}$ signal and prepares subsequent data transmission. After the completion of reading and data transmission of the image data, the signal $\overline{\text{ONLINE}}$ on the control signal line L1 is cleared.

When the signal level of the control signal line L5 assumes RX (high level H), the unit SCU is caused to set a mode where the data sent out of the personal computer 1 is recorded by the plotter REC. In this mode, the unit SCU first sets the plotter to start and then begins data reception after checking both the end of data and the residual quantity of recording paper sheets. In data reception, the level of the control signal line L3 is monitored and 8-bit data on the data lines is then read as the $\overline{\text{SEND}}$ signal has arrived. The read data is stored in the read/write buffer RWB and, when the data of one line has been completely stored, the unit SCU provides an output to the plotter REC.

The unit SCU outputs the signal $\overline{\text{INSTB}}$ to the control signal line L4 for confirmation for each data reception. When the residual quantity of recording paper sheets is reduced, the signal $\overline{\text{PE}}$ of low level is output on the control signal line L5 to inform the reception side (the computer 1) of the fact. When the end of data is detected, the signal $\overline{\text{ONLINE}}$ on the control signal line L1 is cleared. Incidentially, the unit SCU detects the end of data in this embodiment by clocking the lapsed time from the previous data reception, and if the lapsed time reaches a predetermined value, this is judged as the end of data.

There will now be described a facsimile mode (see FIG. 4b). Also in this mode, the unit SCU first checks the level of the control signal line L5, i.e., the control signal $\overline{\text{TX/RX}}$. In this embodiment, when that signal level assumes TX (low level), the unit SCU sets a mode (reception/transfer mode) where the information transmitted from another facsimile connected through the telephone line is transferred to the personal computer 1. And when that signal level assumes RX (high level), the unit SCU sets a mode (transmission/transfer mode) where the data sent out of the personal computer 1 is transmitted to another facsimile connected through the telephone line.

In case of RX (a transmission/transfer mode), the unit SCU first clears the signal $\overline{\text{ONLINE}}$ on the control signal line L1 and then starts preparation for facsimile transmission. This process is proceeded similarly to the ordinary facsimile transmission as follows.

(a) Calling: the counterpart facsimile is called by dialing the telephone set.

(b) Confirmation of calling party: a tone of 2100 Hz is sent out to inform that the calling party is a facsimile terminal.

(c) Confirmation of function: the function of the calling party is informed using the low speed modem (FSK) of 300 bps.

(d) Command information: transmission parameters (transmission rate of the high speed modem, etc.) is informed using the low speed modem.

(e) Training: matching of the high speed modem with the line is made and a predetermined data pattern is sent to check a data transmission error rate.

(f) Response after training: when the data transmission error rate after training is less than a certain value, "Completion of Reception Preparation" is informed to proceed to the next step. When the rate is larger than a certain value, "Request of Retraining" is repeated.

After the completion of transmission preparation, the signal $\overline{\text{ONLINE}}$ is set on the control signal line L1 and then the end of data as well as arrival of the $\overline{\text{SEND}}$ signal are both checked. Upon arrival of the $\overline{\text{SEND}}$ signal, the unit SCU receives 8-bit data on the data lines from the computer interface IFF and stores the same in the read/write buffer RWB. Subsequent to such data input, the signal $\overline{\text{INSTB}}$ is issued onto the control signal line L4. When the data of one line is completely stored, data compression processing is started and, after this processing, data transmission (to another facsimile) is started. It is to be noted that, in this embodiment, data compression processing and data transmission processing are run under interrrupt processing so as to avoid a shift in timing. Incidentially, during transmission of data the control signal $\overline{\text{ONLINE}}$ for the computer interface IFF is cleared to inhibit the computer side from entering the data transmission operation.

After the end of data was detected and transmission of all the data stored in the memory was completed, the unit SCU commands processing for ending the facsimile transmission, clears the signal $\overline{\text{ONLINE}}$ and then returns to checking of the switch SW.

In an operation mode (reception/transfer mode) where the control signal line L5 assumes a low level $\overline{\text{TX}}$, it waits for a reception request from the facsimile (counterpart) on the transmission side. Upon a reception request, connection processing on the reception side is performed similarly to the above mentioned preparation for facsimile transmission, and data reception is then started. Compressed data reproduction processing is implemented for each reception of 1-line data and, after the completion of this processing, the individual 8-bit data are output to the computer interface IFF. At the same time, the unit SCU sets the signal $\overline{\text{SEND}}$ on the control signal line L3 and then waits for that the signal $\overline{\text{INSTB}}$ to appear on the control signal line L4. Upon arrival of the signal $\overline{\text{INSTB}}$, the signal $\overline{\text{SEND}}$ is cleared and thereafter the above process is repeated until all of the 1-line data will be transmitted. After reception from the counterpart facsimile is terminated and the data stored in the memory of the facsimile 10 is all transmitted to the personal computer 1 completely, the unit SCU commands processing for ending the facsimile transmission, clears the signal $\overline{\text{ONLINE}}$ and then returns to checking of the switch SW.

Next, schematic operation of the personal computer 1 will be described by referring to FIG. 5. After the completion of initial setting processing, the CPU of the computer 1 checks the level of the control signal line L1. If, the level is set at $\overline{\text{ONLINE}}$, it proceeds to designation of an operation mode. In other words, thereafter it runs the operation set in accordance with key-in operation effected on the personal computer 1 by an operator.

In this embodiment there are four operation modes; a mode where the data in the computer 1 is recorded by the plotter REC (recording mode), a mode where the data read by the scanner ISA is input to the computer 1 (image input mode), a mode where the data in the computer 1 is transmitted to another facsimile (transmission/transfer mode), and a mode where the data received from another facsimile is input to the computer 1 (reception/transfer mode). As to processing effected on the computer 1 side, however, there are primary two types of operation modes (image output mode and image input mode), because the input/output mode (recording mode, image input mode) and the facsimile mode (transmission/transfer mode, reception/transfer mode) are different from each other just in their signal levels issued to the control signal line L2.

In a mode (image output mode) where data is sent from the computer 1 side to the plotter REC or another facsimile, the CPU of the computer 1 first sets the level of the control signal line L5 at RX and then starts data sending. During this processing, the signal $\overline{\text{ONLINE}}$ on the control signal line L1 and the signal $\overline{\text{PE}}$ on the control signal line L5 are both checked. Subsequent to output of 8-bit data, the CPU sets the $\overline{\text{SEND}}$ signal on the control signal line L3 and, upon arrival of the signal $\overline{\text{INSTB}}$ through the control signal line L4, it clears the $\overline{\text{SEND}}$ signal and then prepares for the next data transmission. After all the data has been transmitted completely, it returns to checking of the signal $\overline{\text{ONLINE}}$.

In a mode (image input mode) where data is input to the computer 1 from another facsimile or the scanner ISA, the CPU of the computer 1 first sets the control signal line L5 at $\overline{\text{TX}}$ (low level) and then checks the signal $\overline{\text{ONLINE}}$ on the control signal line L1. With this signal being issued, it waits for arrival of the $\overline{\text{SEND}}$ signal through the control signal line L3. Upon arrival of the $\overline{\text{SEND}}$ signal, the CPU receives 8-bit data on the data lines and stores the data in the memory at the predetermined address, and then it issues the signal $\overline{\text{INSTB}}$ indicating the completion of reception onto the control signal line L4 and waits for arrival of the next data. If the signal $\overline{\text{ONLINE}}$ disappears, the CPU proceeds to designation of an operation mode after waiting for that the signal $\overline{\text{ONLINE}}$ will appear once again, and thereafter these processes will be repeated.

Accordingly, in case data is transmitted, for example, from the computer 1 side to the facsimile 10 side, the signals as shown in FIG. 6a appear on the interface cable CAB. More specifically, when the facsimile 10 outputs the $\overline{\text{ONLINE}}$ signal, the computer 1 outputs the predetermined 8-bit data onto the data lines and subsequently otuputs the $\overline{\text{SEND}}$ signal onto the control signal line L3. After confirming the $\overline{\text{SEND}}$ signal, the facsimile 10 takes in the 8-bit data on the data lines and outputs the $\overline{\text{INSTB}}$ signal to inform reception on its side. After confirming the $\overline{\text{INSTB}}$ signal, the computer 1 clears the $\overline{\text{SEND}}$ signal and then prepares for the next data transmission.

By referring to FIG. 6b there will be now be described in detail operation of the facsimile 10 and the computer 1 in case the residual quantity of recording paper sheets becomes small during reception of data from the computer 1 by the facsimile 10, i.e., during recording by the plotter REC. In this mode, the signal $\overline{\text{TXRX}}$ issued from the computer 1 assumes a high level H at the beginning, so that G11 is opened and G12 is closed. The control signal line L5 indicates a high level H because it is pulled up to the power source line through a resistor. This causes the terminal ① of the exclusive OR gate EXOR on the facsimile side to assume H and normally the terminal ② also assumes H, so that its output terminal becomes L to make G5 of the gate GA1 open and G6 thereof closed. The facsimile 10 normally sets the port P4 of the output port OP1 at a high level H, but it outputs a low level L at the port P4 when recording paper sheets are decreased in the residual quantity. This signal is output onto the control signal line L5 through the gate G5 to become the signal $\overline{\text{PE}}$ indicating the decreased residual quantity of recording paper sheets. Since the gate G11 is opened on the computer 1 side, this signal $\overline{\text{PE}}$ is sent to the computer 1. Upon arrival of this signal, after sending the predetermined data the computer 1 stops transmission of data and then sets the control signal line L5 at a $\overline{\text{TX}}$ level.

When the control signal line L5 becomes a $\overline{\text{TX}}$ level (L), the output level of the gate EXOR on the facsimile side is inverted to H causing G5 of the gate GA1 to close and G6 thereof to open, so that the $\overline{\text{TX}}$ level is applied to the port P8 of the input port IP1. By monitoring the level at the port P8, the facsimile 10 recognizes the fact that the RX mode (transmission/transfer mode) has changed into the $\overline{\text{TX}}$ mode (reception/transfer mode).

Although switching between a facsimile mode and an input/output mode was made using the control signal line in the foregoing embodiment, this mode setting may be performed by sending the given control code through the 8-bit data lines. Further, although a specific control signal line was prepared for sending the signal $\overline{\text{ONLINE}}$ indicating whether or not the facsimile 10 is in such a state as enabling communication with the computer 1 in the foregoing embodiment, it is also possible to pass both the signal $\overline{\text{ONLINE}}$ and the signal $\overline{\text{PE}}$ indicating the decreased residual quantity of recording paper sheets through the same single line. By so doing, the control signal lines L1 and L2 in the illustrated embodiment becomes needless, thus resulting in the less number of signal lines. Moreover, although the confirmation signal $\overline{\text{INSTB}}$ was used in the foregoing embodiment to improve reliability of signal transmission, that signal may be dispensed with. In such case, confirmation of the signal $\overline{\text{INSTB}}$ is omitted and the $\overline{\text{SEND}}$ signal is so controlled as to be output for a predetermined time on the transmission side. Consequently, what is required at minimum is only bidirectional data lines of 8 bits and two bidirectional control signal lines L3, L5.

In addition, although the foregoing embodiment used the normal image data for data transmission between the facsimile 10 and the computer 1, the compressed and coded data may be transmitted as an alternative. In such case, since the amount of data is decreased, the time necessry for data transmission is shortened. Finally, although a personal computer was connected to a facsimile apparatus in the foregoing embodiment, other equipments which have an equivalent function, such as word processors, office computers or intelligent terminal units, are also connectable to the facsimile apparatus.

According to the embodiment as described above, data transmission is enabled between a facsimile apparatus and a computer or so, and an interface circuit is simplified in its configuration. In particular, a part of both data lines and control signal lines is formed of bidirectional lines and this permits high-speed data transmission using less signal lines.

Other various modifications will become possible for those skilled in the art after receiving the teachings of the present disclosure without departing from the scope thereof.

What is claimed is:

1. An image information processing system comprising:
   (a) a facsimile including scanner means for reading image information, plotter means for recording image information on a recording medium, and system control means for controlling the operation of said facsimile and including means coupled to said plotter means and responsive to the absence of the recording medium to generate an end-of-medium signal;
   (b) a computer system; and (c) interface means for connecting said computer system and said facsimile, and comprising control signal lines and data lines;
(d) said system control means sending an end-of-medium signal to said computer system through one of said control signal lines, said one control line adapted for the transmission of control signals in a first direction from said computer to said facsimile and in a second direction from said facsimile to said computer system; and
(e) said system control means generating and transmitting first and second send control signals indicative respectively of image information transmission in said first and second directions via said one control signal line.

2. A system for processing and controlling the transmission of image information to and from first and second image information utilization means, said image processing system comprising:
(a) scanner means for scanning an original document to read an image of said original document and to provide an image signal indicative of said document image;
(b) plotter means responsive to an image signal for recording a corresponding image on a record medium;
(c) network control means for controlling the receiving and transmitting via a communication line of communication signals from and to the first utilization means;
(d) modem means for modulating an image signal to provide a communication signal and for demodulating a communication signal to provide an image manifestation;
(e) connection means for receiving and transmitting data from and to the second utilization means and comprising a plurality of bi-directional data signal lines for transmitting image signals, and first and second bidirectional control signal lines for transmitting control signals;
(f) interface means coupled to said connection means and comprising gate means operative in response to said control signals in transmitting and receiving modes for respectively transmitting and receiving control signals and image signals to and from said second utilization means; and
(g) system control means for operating said gate means in one of said transmitting and receiving modes to control the flow of image signals between said image processing system and the second utilization means, said system control means operating said gate means in its receiving mode for receiving image signals on said data signal lines upon reception of a control signal of a predetermined level on said second control signal line when a control signal of a reception level is disposed on said first control signal line, said system control means operating said gate means in said transmitting mode for transmitting image signals onto said data signal lines and also transmitting a control signal of said predetermined level on said second control signal line upon receipt of a control signal of a transmission level on said first control signal line, said system control means further comprising means for detecting the abnormal operation of said image processing system to operate said gate means in its transmitting mode and for out putting a control signal of said predetermined level on said first control signal line, a switch disposable to a position whereby said system is operable in one of said transmitting and receiving modes, means for applying said image signals received from the second utilization means through said interface means to said plotter means, means for applying the image signals received from said scanning means through said interface means for said data signal lines to the second utilization means, means for modulating said image signal received through said interface means to provide a communication signal before transmitting said communication signal through said network control means and the communication line from the first utilization means to provide a corresponding image signal before transmitting said corresponding image signal via said interface means and said data signal lines to the second utilization.

3. A system for processing and controlling the transmission of image information over a communication line, said image processing system comprising:
(a) computer means;
(b) facsimile means;
(c) interface connecting means for interconnecting said computer means and said facsimile means;
(d) said facsimile means including scanner means for scanning an original document to read an image thereon to provide an image signal indicative of said document image, plotter means responsive to an image signal for recording an image on a recording medium, network control means for controlling the receiving and transmission of communication signals to and from the communication line, modem means for modulating an image signal to provide a corresponding communication signal and for demodulating a communication signal to provide a corresponding image signal, first interface means having first bi-directional gate means for transmitting and receiving control signals and second bi-directional gate means for transmitting and receiving image signals, and system control means;
(e) said computer means including second interface means having third bi-directional gate means for transmitting and receiving said control signals and fourth bi-directional gate means for transmitting and receiving said image signals;
(f) said interface connection means comprising a unidirectional control signal line for transmitting a control signal from said second interface means to said first interface means; first, second and third bi-directional control signal lines, each connected at one end with said first bi-directional gate means and at its other end with said third bi-directional gate means; and a plurality of bi-directional data signal lines, each connected at one end with said second bi-directional gate means and at its other end with said fourth bi-directional gate means; and
(g) said system control means comprising means responsive to a control signal of a first level on said unidirectional control signal line, a control signal of said first level on said first bi-directional control signal line, and a control signal of said first level on said second bi-directional control signal line, for transmitting to said plotter means said image signals on said data signal lines, before providing on said third bi-directional control signal line a control signal of said first level; means responsive to a control signal of a first level on said unidirectional control signal line and a control signal of a second level on said firt bi-directional control signal line for providing said bi-directional data signal lines with said image signals from said scanner means, before first providing a control signal of said first level to said second bi-directional control signal line and thereafter providing a control signal of said second level on said second bi-directional control signal line after receiving a control signal of said first level from said third-directional control signal line; means responsive to a control signal of said second level on said unidirectional control signal line, a control signal of said first level on said first bi-directional control signal line and a control signal of said first level on said second bi-directional control signal line, for applying said image signals on said data signal lines to said modem means for modulating to provide a corresponding communication signal to be transmitted over the communication line and then providing a control signal line; and means for controlling said modem means to demodulate a communication signal to provide a corresponding image signal and for applying said corresponding image signals to said bi-directional data signal lines, before providing said bi-directional control line with a control signal of said first level.

4. An image information processing system as set forth in claim 3, wherein said system control means comprises means responsive to the abnormal operation of said facsimile means for providing a control signal of said first level on said first bi-directional signal line as indicative of said abnormal operation in response to a control signal of said first level on said unidirectional control signal line and a control signal of said first level on said first bi-directional signal line.

5. A system for processing image information as transmitted over a communication line, said image processing system comprising:

(a) computer means;
(b) facsimile means;
(c) interface means for interconnecting said computer means and said facsimile means;
(d) said facsimile means including scanner means for scanning an original document to read an image thereon to provide an image signal indicative of said document image; plotter means for recording an image signal on a recording medium; network control means coupled to the communication line for controlling the reception and transmission of communication signals from and to the communication line respectively; modem means for modulating an image signal to provide a communication signal and for demodulating a communication signal to provide an image signal; first interface means having first and second bi-directional gate means coupled to said interface interconnecting means for transmitting and receiving control signals and image signals respectively; a mode selection switch operable to first and second positions to effect operation of facsimile means in corresponding first and second modes, and system control means; and
(e) computer means including second interface means having third and fourth bi-directional gate means coupled to said interface interconnecting means for transmitting and receiving said control signals and said image signals respectively;
(f) said interface interconnecting means comprising a first unidirectional control signal line for sending a control signal from said first interface means to said second interface means; a second unidirectional control signal line for sending a control signal from said second interface means to said first interface means; first, second and third bi-directional control signal lines, each connected at one end to said first bi-directional gate means and at its other end to said third bi-direction gate means; and a plurality of bi-directional data signal lines, each connected at one end with said second bi-directional gate means at its other end with said fourth bi-directional gate means for transmitting image signals therebetween;
(g) said system control means responsive to the disposition of said mode selection switch to its first position to operate said facsimile means in a first mode, wherein a control signal of a first level is applied to said first unidirectional control signal line to disable the transfer of control signals and image signals via said interface interconnecting means, and said network control means is coupled via the communication line in normal communication with another facsimile; and
(h) said system control means comprising means responsive to the disposition of said mode switch to its second position to operate said facsimile means in its second mode, wherein a control signal of a second level is applied to said first unidirectional control signal line to enable the transfer of said control signals and image signals via said interface interconnecting means; means responsive to a control signal of a first level on said second unidirectional control signal line, a control signal of a second signal level on said first bi-directional control signal line and a control signal of a first level on said second bi-directional control signal line, for applying said image signals on said data image lines to said plotter means, before applying a control signal of said first level to said third bi-directional control signal line; means responsive to a control signal of a first level on said second unidirectional control line, for applying image signals derived from scanner means to said bi-directional data signal lines, before applying a control signal of said first level to said second bi-directional signal line and responsive to a control signal of said first level on said third bi-directional control signal line for thereafter applying a control signal of said second level to said second bi-directional control signal line; means responsive to a control signal of said second level on said second unidirectional control line, a control signal of a first level on said first bi-directional signal line and a control signal of said first level on said second bi-directional signal line, for providing said image signals on said data signal lines to said modem to provide a communications signal to be applied to the communication line, and thereafter applying a control signal of the first level to said third bi-directional control signal line; and means responsive to a control signal of said second level on said second unidirectional control signal line and a control signal of a second level on said first bi-directional signal line for receiving a communication signal over the communication line, for controlling said modem means to demodulate said received communication signal to provide image signals to said bi-directional data signal lines before applying a control signal of said first level to said second bi-directional control signal line.

6. An image information processing system as set forth in claim 5, wherein said system control means comprises means responsive to the reception of control signals of said first level on said second unidirectional control line and said third bi-directional line, for detecting the abnormal operation of facsimile means to provide a control signal of said first level on said first bi-directional signal line to indicate the abnormal operation of said facsimile means.

7. An image information processing system as set forth in claim 6, wherein said abnormal operation is exhaustion of said recording medium.

8. An interface system for rapidly transmitting signals indicative of an image between a computer and a facsimile, said interface system comprising:
(a) a set of bi-directional data lines coupled at opposite ends to said computer and said facsimile for selectively transmitting in parallel image signals in either of a first direction from said computer to said facsimile or of a second direction from said facsimile to said computer;
(b) first and second bi-directional control lines coupled at opposite ends to said computer and said facsimile for selectively transmitting control signals in either of said first or second directions;
(c) first interface means associated with said facsimile and comprising first and second gates respectively coupled to one end of said first and second control lines, and to one end of said data lines; and
(d) second interface means associated with said computer and comprising third and fourth gates respectively coupled to the other ends of said first and second control lines and to the other ends of said data lines;
(e) said first and third, and second and fourth gates operative in a first mode for transmitting respectively control signals and image signals therethrough in said first direction and in a second mode for transmitting said control signals and said image signals in said second direction;
(f) said second interface means further comprising computer control means responsive to the operation of said computer for applying a selected one of said first and second control signals to said third and fourth gates and via said first control line to said first and second gates to operate said first, second, third and fourth gate means in either their first or second modes, respectively;
(g) after providing said control signal, said computer means first applying image signals to said fourth gate and, then, applying a send control signal via said second control line towards said facsimile;
(h) said first interface means for applying image signals to said second gate, before applying a send control signal via said second control line towards said computer.

9. The interface system as claimed in claim 8, wherein said facsimile is operative in an image processing mode of operation and in a data interchange mode for interchanging data to and from said computer, and there is included a unidirectional control line coupled at opposite ends to said computer and said facsimile, and said first interface means comprising means responsive to the operation of said computer in its data interchange mode for applying an on-line control signal via said unidirectional control line towards said computer.

10. The interface system as claimed in claim 9, wherein said computer control means is responsive to the presence on said unidirectional control line of said on-line control signal for generating said selected one of said first and second control signals.

11. The interface system as claimed in claim 8, wherein there is included facsimile control means associated with said facsimile and responsive to an abnormal condition of said facsimile for transmitting an end-of-data transmission control signal to said first gate, whereby said first gate is disposed in its second mode and via said first control line to said computer control means, and said computer control means responsive to said end-of-data transmission data control signal for disabling further transmission of image signals from said computer.

12. A system processing and controlling the transmission of image signals, comprising:
(a) a facsimile including scanner means for scanning an image carried by a document to provide an image signal indicative of said document to provide an image signal for recording a corresponding image on a recording medium, first interface means including first bi-directional gate means for selectively transmitting and receiving control signals and second bi-directional gate means for selectively transmitting and receiving image signals, and facsimile control means;
(b) a computer comprising second interface means including third bi-directional gate means for selectively transmitting and receiving control signals and fourth bi-directional gate means for selectively transmitting and receiving said image signals, and computer control means;
(c) interface connection means comprising a set of bi-directional data lines coupled at opposite ends respectively to said second and fourth bi-directional gate means for selectively transmitting in parallel a set of said image signals in either of a first direction from said computer to said facsimile or in a second direction from said facsimile to said computer, and first and second bi-directional control lines coupled at opposite ends to said first and third bi-directional gate means for selectively transmitting control signals in either of said first or second directions;
(d) said first and third, second and fourth bi-directional gate means operative in either a first mode for transmitting respectively said control signals and image signals therethrough in said first direction or in a second mode for transmitting said control signals and said image signals therethrough in said second direction; (e) said computer control means being responsive to the operation of said computer for applying a selected one of a first and second control signals to said third and fourth bi-directional gate means and via said first control line to said first and second bi-directional gate means to operate said first, second, third and fourth bi-directional gate means in their first or second modes, respectively, and, after applying said first control signal, for applying a set of image signals to said fourth bi-directional gate means before applying in said first direction a send control signal via said second control line and said first bi-directional gate means to said facsimile control means;
(f) said facsimile control means responsive to said first control signal for operating said scanner means to generate and apply a set of image signals to said second bi-directional gate means before applying a send control signal via said second control line and said third bi-directional gate means to said computer control means, and responsive to said second control signal for enabling said plotter means and for detecting the presence of said send signal transmitted in said first direction on said second control line to transmit a set of image signals from said second bi-directional gate means to said plotter means, whereby said plotter means records an image on the recording medium in accordance with said transmitted set of image signals.

13. The image processing and transmission system as claimed in claim 12, wherein said interface connection means further comprises a third bi-directional control line coupled at opposite ends to said first and third bi-directional gate means for transmitting in said first and second directions a data received signal indicative that a set of image signals has been received.

14. The image processing and transmission system as claimed in claim 13, wherein said computer control means is responsive to the reception of a set of image signals for transmitting via said third bi-directional gate means and said third bi-directional control lines a data received signal, said facsimile control means responsive to the receipt of said data received signal for terminating the transmission of said send control signal.

15. The image processing and transmission system as claimed in claim 12, wherein there is further included a third control line coupled at opposite ends to said facsimile and computer control means; said facsimile control means comprising network control means for controlling the transmission and reception of image data corresponding to said image signals via a transmission line to another facsimile; said computer control means comprising command entry means for selectively providing either a first mode command for operating said system to transmit image data between said computer and the other facsimile via said facsimile and the transmission line or a second mode command for operating said system to transmit image signals between said facsimile and said computer, said first and second mode commands applied via said third control line to said network control means; said network control means rendered operative in response to said first mode command and comprising means responsive to said first control signal for receiving image data from the other facsimile via the transmission line and applying a set of data signals to said second bi-directional gate means, before sending a send control signal via said second control line to said computer control means, said operative network control means responsive to said second control signal from said computer control means for first detecting the presence of a send control signal on said second control line for receiving a set of image signals from said second bi-directional gate means and thereafter transmitting corresponding image data via the transmission line to the other facsimile.

16. The image processing and transmission system as claimed in claim 15, wherein said facsimile includes modem means coupled to said network control means for modulating image manifestations to provide a corresponding compacted communication signal to be transmitted over the transmission line and for demodulating communications received over the transmission line to provide corresponding image signals.

* * * * *